(12) United States Patent
Klinger et al.

(10) Patent No.: US 6,175,082 B1
(45) Date of Patent: *Jan. 16, 2001

(54) MOUSE CORD CONTROL DEVICE

(76) Inventors: Robert C. Klinger, 311 Shady Nook Rd., Harleysville, PA (US) 19438; Troy E. Bergstrom, RR 1, Box 449, Macungie, PA (US) 18062

( * ) Notice: Under 35 U.S.C. 154(b), the term of this patent shall be extended for 0 days.

This patent is subject to a terminal disclaimer.

(21) Appl. No.: 08/434,263

(22) Filed: May 3, 1995

Related U.S. Application Data

(63) Continuation of application No. 08/106,579, filed on Aug. 16, 1993, now abandoned.

(51) Int. Cl.[7] ............................................ F16L 3/00
(52) U.S. Cl. .......................... 174/135; 24/457; 24/339; 248/231.8; 248/51; D19/56
(58) Field of Search ................. 174/135, 72 A; 24/67.11, 67.9, 339, 336, 457, 531; 248/51, 52, 231.8, 316.7; D19/56

(56) References Cited

U.S. PATENT DOCUMENTS

| D. 206,783 | * | 1/1967 | McCormick | D19/65 X |
|---|---|---|---|---|
| 0,344,567 | * | 6/1886 | Coleman | 24/366 X |
| D. 350,947 | * | 9/1994 | Klinger et al. | D14/114 |
| 1,064,788 | * | 6/1913 | Terry | 24/457 |
| 2,523,185 | * | 9/1950 | Bedford, Jr. | 248/74.2 X |
| 4,100,652 | * | 7/1978 | Carlson | 24/336 X |
| 4,121,798 | * | 10/1978 | Schumacher et al. | 24/336 X |
| 5,022,124 | * | 6/1991 | Yin | 24/67.9 |

FOREIGN PATENT DOCUMENTS

| 0414251 | * | 6/1925 | (DE) | 248/52 |
|---|---|---|---|---|
| 0888662 | * | 12/1943 | (FR) | 24/336 |
| 1024880 | * | 4/1953 | (FR). | |

OTHER PUBLICATIONS

Robert C. Klinger & Troy E. Bergstrom, Mouse Cord Clip, U.S. Design Patent Application Serial No. 07/948,897 filed Sep. 21, 1992.
Article "Eliminate the Mouse Mess" from BYTE Magazine (Jul. 1992).
Forminco, 1989, 1990, 1991, 4 pages.*

* cited by examiner

Primary Examiner—Hyung-Sub Sough
(74) Attorney, Agent, or Firm—Frank A. Cona

(57) ABSTRACT

A device for controlling the movement of an electrical cord which connects a computer mouse to a computer. The device is made of a shackle made of a partially cylindrical body having flared lips which extend along the shackle body and a mounting structure attached to the shackle. The device shackle attaches to a mouse cord and the device mounting structure is attachable to stationary objects such as mouse pads or desk tops. The device limits the movement of a computer mouse cord to a length necessary to operate a computer mouse while restraining the remaining mouse cord length by allowing the length of mouse cord between the mouse and the shackle to be moved while the length of cord between the shackle and the computer is held stationary by the device.

12 Claims, 9 Drawing Sheets

MOUSE CORD CONTROL DEVICE

This application is a continuation of application Ser. No. 08/106,579, filed Aug. 16, 1993 now abandoned.

BACKGROUND OF THE INVENTION

The present invention relates to computer equipment and, more particularly, to a device for controlling excess computer mouse cord connecting a computer mouse to a computer.

A computer mouse is connected to a computer by an electrical cord. The cord is constructed to be long enough for the computer end of the cord to be plugged into the back of a computer while the mouse end of the cord extends to the front of the computer where it is attached to a mouse. This allows a computer operator to manipulate a mouse near the front of the computer while the operator observes the computer video display.

Computer mice are designed so that movement of a mouse corresponds to movement of a pointer shown on a computer's video display. It is only necessary to move a portion of the total mouse cord's length when moving the mouse in order to move the pointer within the bounds of the video display; however, since there is no impediment to movement of the mouse cord, when the mouse is moved even a short distance, nearly the entire length of the mouse cord also move. It is a common problem that movement of the computer mouse by the computer operator causes the unfettered mouse cord to entangle with other computer wiring and electrical cords. It is also a common problem that mouse cord movement sweeps pencils, papers, coffee cups, and other common items off of computer tables and desks. Entanglement of mouse cord with computer wiring and sweeping of items off of desks are distractions which interrupt computer operators during their work resulting in frustrated computer operators and time lost to untangling cords and cleaning up spills.

Thus, a need exists for a device which limits mouse cord movement to a length of mouse cord necessary to operate a computer mouse yet restrains the movement of the remaining length of mouse cord to prevent cord tangling and spills.

Accordingly, it is an object of the present invention to provide a device which limits mouse cord movement to a length of mouse cord necessary to operate a computer mouse while restraining the movement of the remaining length of mouse cord to prevent mouse cord tangling and mouse cord caused spills.

SUMMARY OF THE INVENTION

To achieve the foregoing and other objects of and in accordance with the purposes of the present invention as embodied and broadly described herein, the device comprises a shackle for attachment to said mouse cord, said shackle is comprised of a partially cylindrical body having flared lips, said lips, extending horizontally on said body and a mounting means attached to said shackle for mounting said device on a stationary object. One characterization of the resent invention comprises a device wherein said mounting means is comprised of a support member attached to the shackle; a top member attached to said support member; said top member comprised of a plate having an angled flange; a base member attached to said support member, said base member having a top side, a bottom side, and a cut out portion; and a plurality of studs projecting from said top side of said base member.

In another characterization of the present invention, said support member has a receptacle means and said top member is further comprised of an insertable member attached to said plate, said insertable member of said top member is engageable with said receptacle means of said support member.

In another characterization of the present invention, said mounting means is comprised of a support member attached to said shackle, and a base member attached to said support member, said base member having a cut-out portion.

In yet another characterization of the present invention, said mounting means is comprised of a spacing means attached to the shackle; a support member attached to said spacing means; a top member attached to said support member; said top member comprised of a plate having an angled flange; a base member attached to said support member, said base member having a top side, a bottom side and a cut-out portion; and a plurality of studs projecting from said top side of said base member.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENTS

Figure 1:
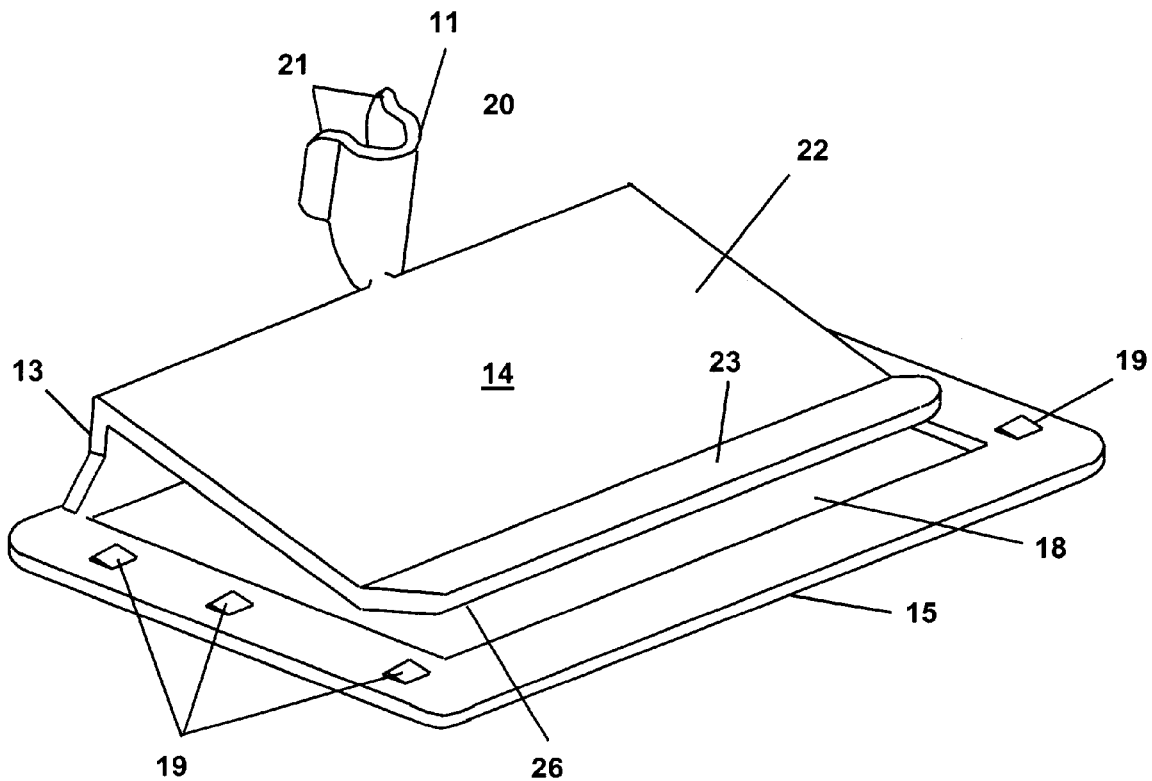
FIG. 1 is a perspective view depicting an embodiment of the device of the present invention.
Figure 2:
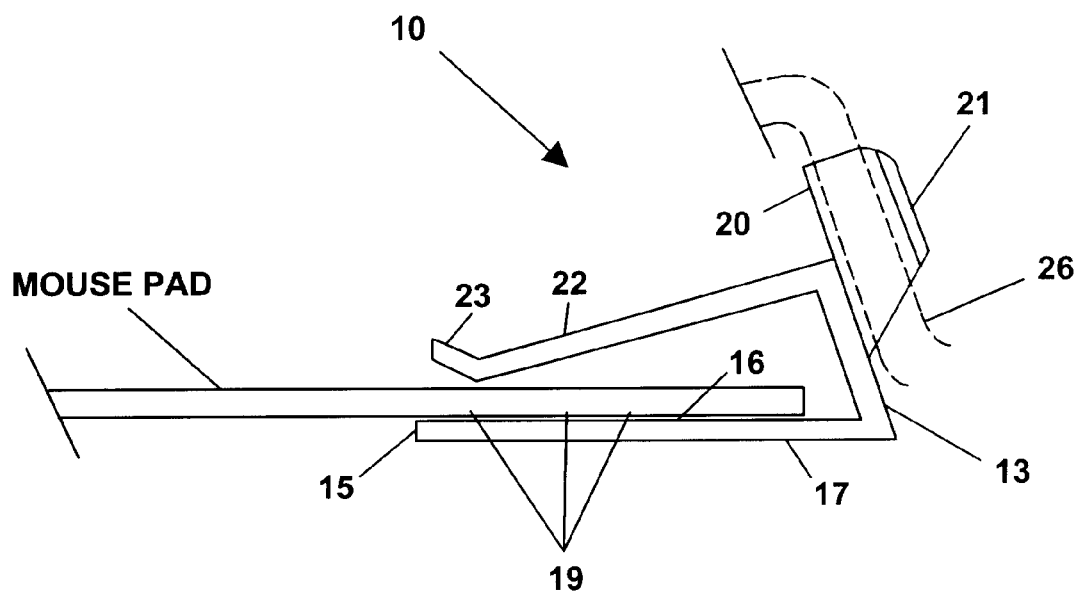
FIG. 2 is a side view of the device depicted in FIG. 1 illustrating the shackle attached to a partially cut away portion of mouse cord.
Figure 3:
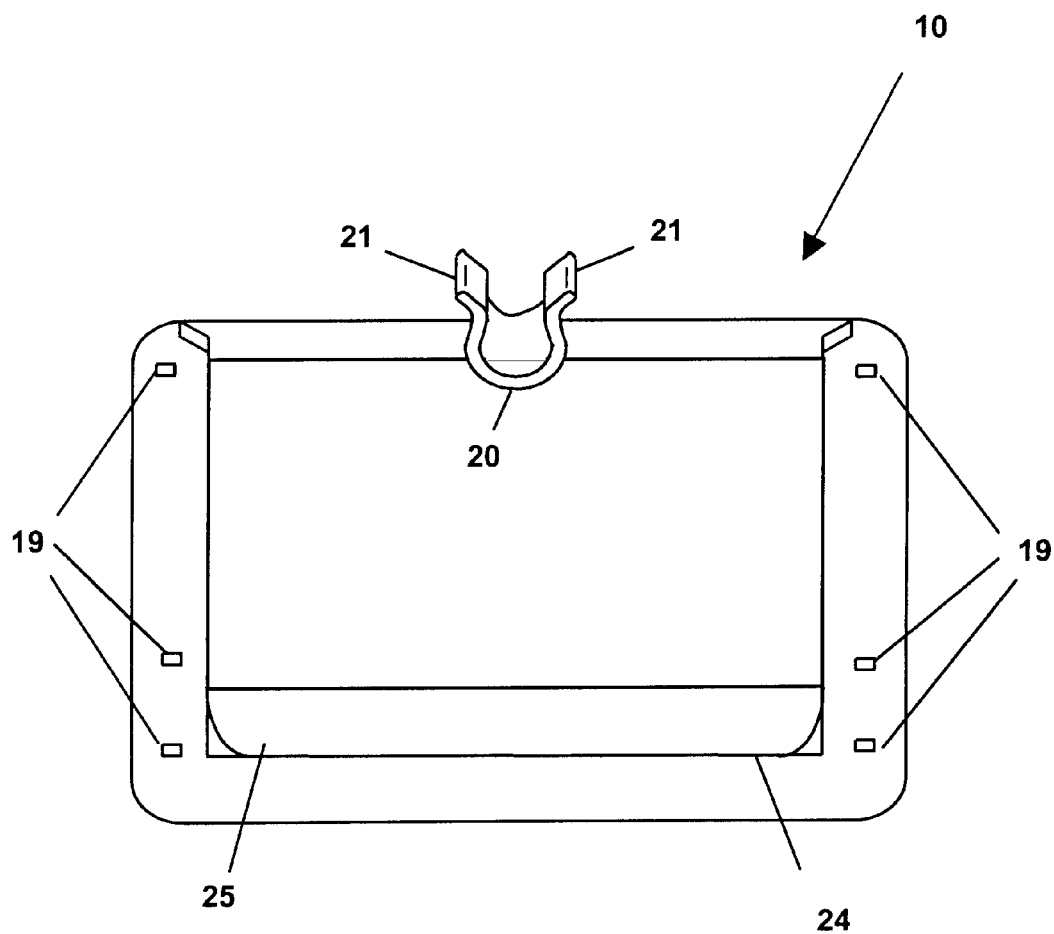
FIG. 3 is a top view of the device depicted in FIG. 1.

The mouse cord controlling device of this invention is depicted generally as 10 in FIGS. 1, 2, and 3. Device 10 is comprised of a shackle 11 attached to a mounting means. The mounting means is comprised of a support member 13 attached to shackle 11, top member 14 attached to support member 13, and base member 15 attached to support member 13. Base member 15 has a top side 16, a bottom side 17, a cut-out section 18, and a plurality of studs 19 projecting from top side 16. Base member 15 is attached to support member 13 at an acute angle as shown in FIG. 2. Shackle member 11 is comprised of partially cylindrical body 20 having flared lips 21 extending longitudinally on body 20 as shown in FIGS. 1 and 3. Top member 14 is comprised of plate 22 having flange 23. Plate 22 is attached perpendicularly to support member 13 and flange 23 is attached at an obtuse angle to plate 22 as shown in FIGS. 1 and 2. Flange 23 has beveled corners 24 and 25 as shown in FIG. 3 to prevent injury to device users from sharp flange corners.

Device 10 is utilized by mounting device 10 onto stationary objects such as onto a mouse pad by sliding the mouse pad between base member 15 and top member 14. The obtuse angled attachment of flange 23 to plate 22 allows for easy passage of the mouse pad between base member 15 and top member 14 while studs 19 act as barbs on the underside of an inserted mouse pad to frictionally secure the mouse pad between base member 15 and top member 14. Studs 19 are shown in FIGS. 1–3 as semi-conical projections; however, the studs can be any projecting shape so long as they frictionally secure mouse pads between base member 15 and top member 14. Mouse cord 26 is then inserted between lips 21 and into partially cylindrical shackle body 20 to secure mouse cord 26 to device 10 as shown in FIG. 2. Device 10 is constructed of resilient polymeric materials or metals permitting top member 14 and base member 15 to flex apart so that mouse pads of various thicknesses can be inserted between top member 14 and base member 15 and to allow repeated insertion of mouse cord into shackle 11. Device 10 can also be utilized without a mouse pad by mounting the device on a stationary surface such as on a desk top or on a computer table by glue or by other affixing means and then inserting the mouse cord into the device's shackle to restrain the excess mouse cord. Thus, device 10 allows a computer mouse user to move the length of mouse cord extending from the shackle to the mouse which is necessary to operate a computer mouse while controlling the movement of excess cord extending from the shackle to the back of the computer thereby preventing the excess cord from causing spills and cord entanglement when the computer mouse is moved.

Figure 4:
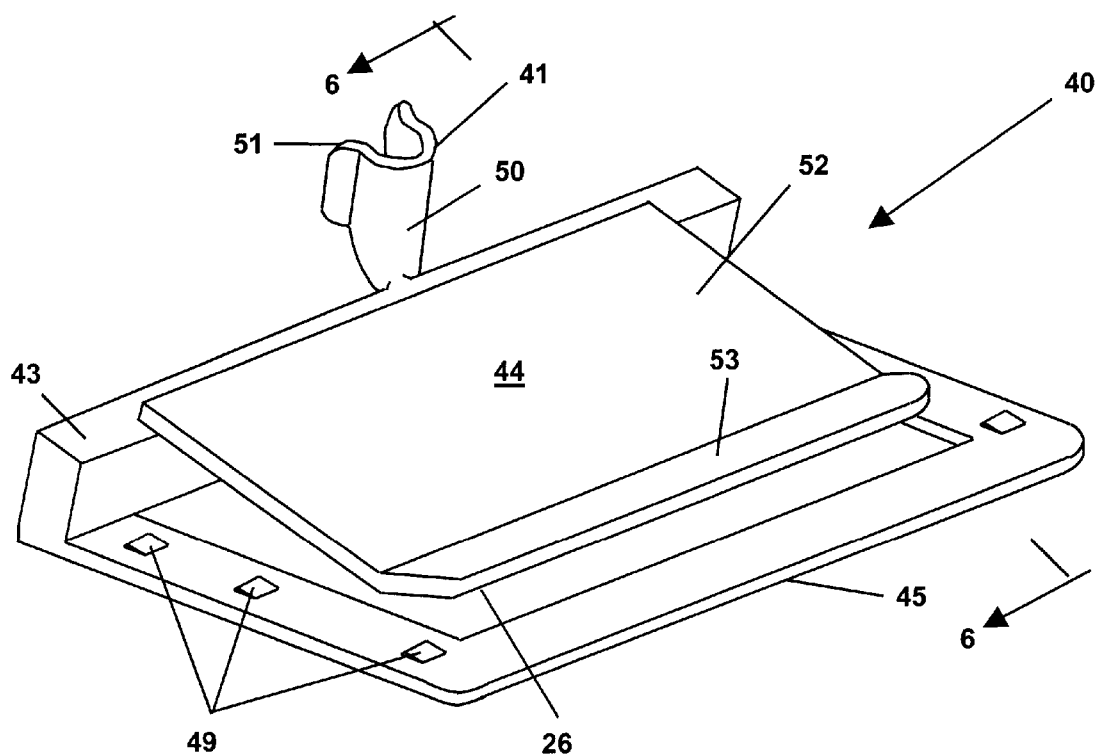
FIG. 4 is a perspective view depicting an embodiment of a device of the present invention.
Figure 5:
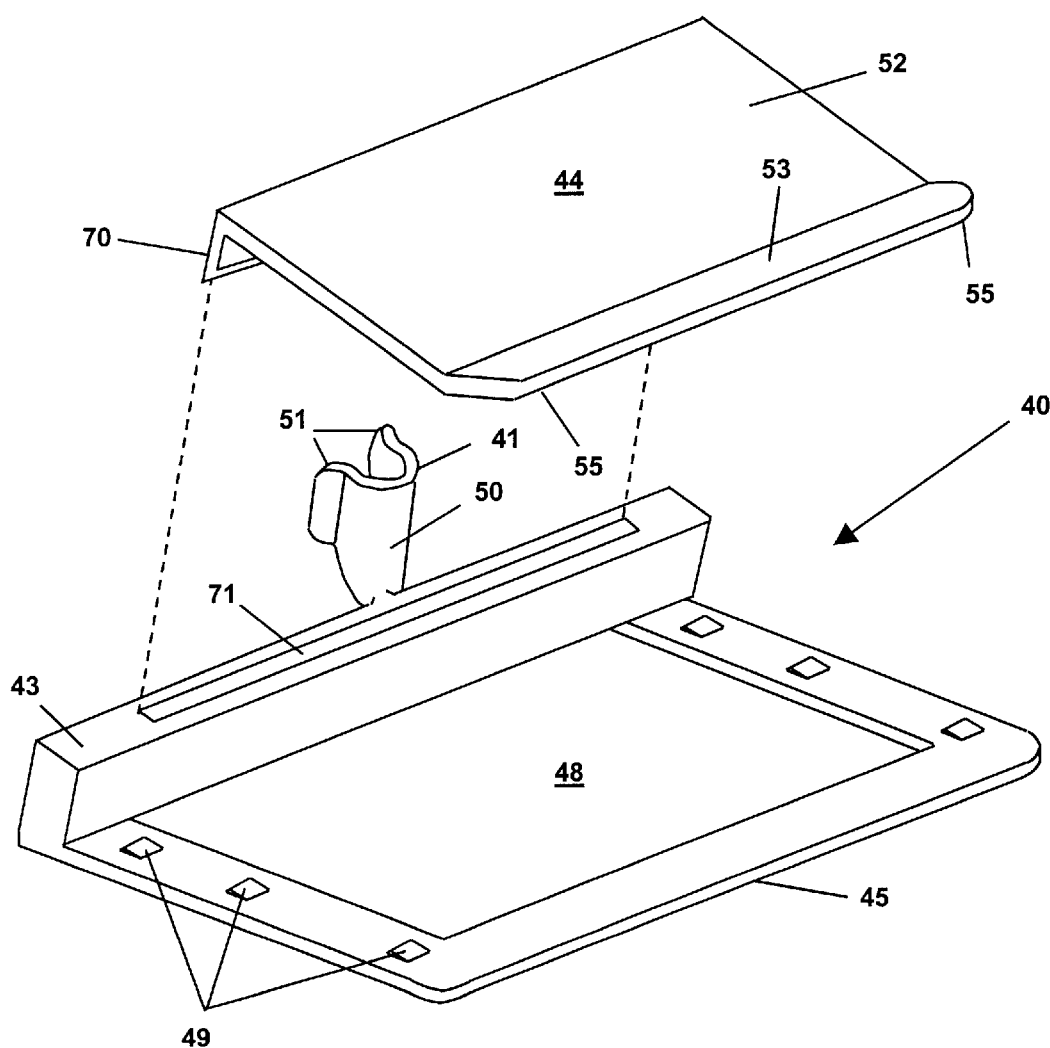
FIG. 5 is a is an exploded perspective view of the device depicted in FIG. 4.
Figure 6:
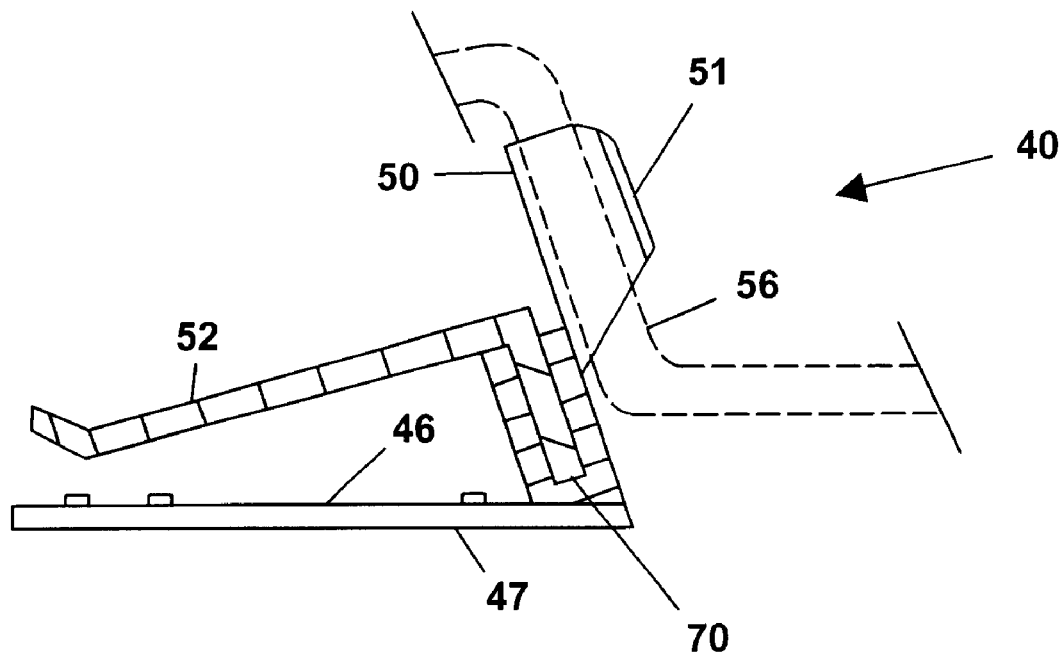
FIG. 6 is a partially cut-away, cross-sectional view taken along line 6—6 of the device depicted in FIG. 4 illustrating the shackle attached to a partially cut-away portion of mouse cord.

Another embodiment of this invention is shown generally as device 40 in FIGS. 4–6. Device 40 is comprised of a shackle 41 attached to a mounting means comprising a support member 43 attached to shackle 41, a top member 44 attached to support member 43, and a base member 45 attached to support member 43. Base member 45 has a top side 46, a bottom side 47, a cut-out section 48, and a plurality of studs 49 projecting from top side 46 of base member 45 as shown in FIGS. 5 and 6. Base member 45 is attached to support member 43 at an acute angle. Shackle 41 is comprised of a partially cylindrical body 50 having flared lips 51 extending longitudinally on body 50 as shown in FIGS. 4, 5, and 6. Top member 44 is comprised of plate 52 having flange 53, and insertable member 70. Flange 53 is attached at an obtuse angle to plate 52 and has beveled corners 54 and 55 as shown in FIG. 5 to prevent injury to device users from sharp flange corners. Plate 52 is attached perpendicularly to insertable member 70 as shown in FIGS. 5 and 6. Support member 43 has a receptacle 71 which is engageable with insertable member 70 of top member 44. Device 40 is utilized by mounting device 40 on a stationary object such as onto a mouse pad by sliding the mouse pad between base member 45 and top member 44. The obtuse angled attachment of flange 53 to plate 52 allows for easy passage of the mouse pad between base member 45 and top member 44 while studs 49 act as barbs on the underside of the inserted mouse pad to frictionally secure the mouse pad between base member 45 and top member 44. Studs 49 are shown in FIGS. 4 and 5 as conical projections; however, the studs can be any projecting shape so long as they frictionally secure mouse pads between base member 45 and top member 44. Mouse cord 56 is then inserted between lips 51 and into partially cylindrical shackle body 50 to secure mouse cord 56 to device 40 as shown in FIG. 6. Support member 43 and base member 45 are both constructed of resilient polymeric material or metals. Top member 44 is constructed of either resilient metal or of resilient polymeric material, permitting top member 44 and base member 45 to flex apart so that mouse pads of various thicknesses can be inserted between top member 44 and base member 45 and to allow repeated insertion of mouse cord into shackle 41. Device 40 can also be utilized without a mouse pad by affixing the device to a surface by gluing or other affixing means and inserting mouse cord into the device shackle to restrain the excess cord. Thus, device 40 allows a user to utilize a length of mouse cord needed to operate a computer mouse while restraining the remaining length of the mouse cord as described above. Device 40 also provides a separable two-piece design which facilitates attachment of labels and allows printing or engraving on plate 52.

Figure 8:
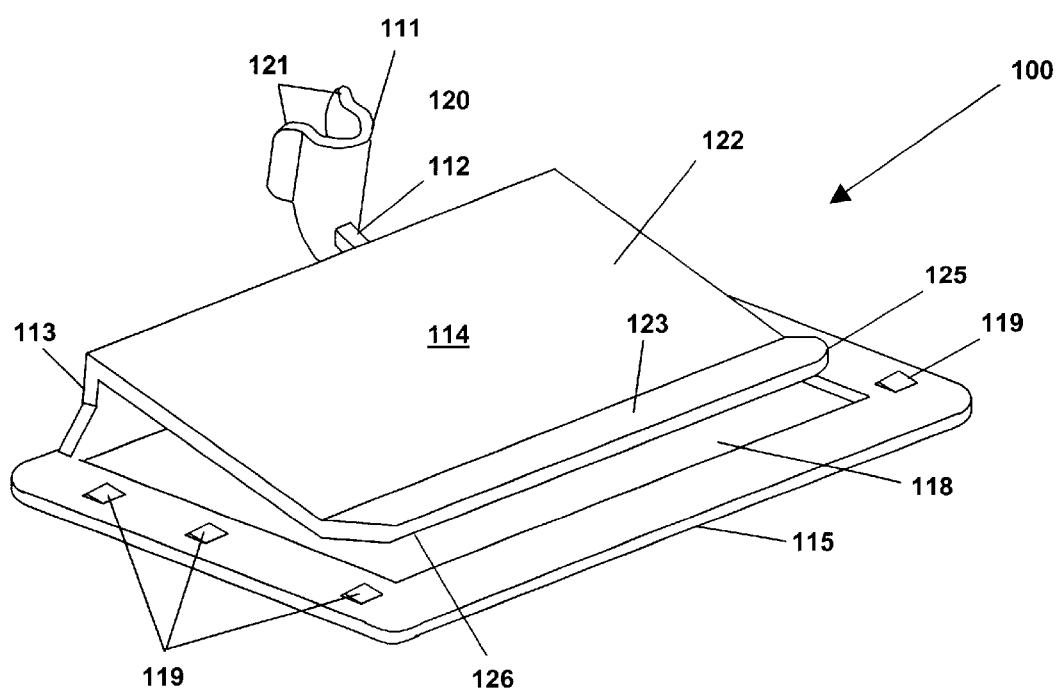
FIG. 8 is a perspective view depicting an embodiment of the device of the present invention.
Figure 9:
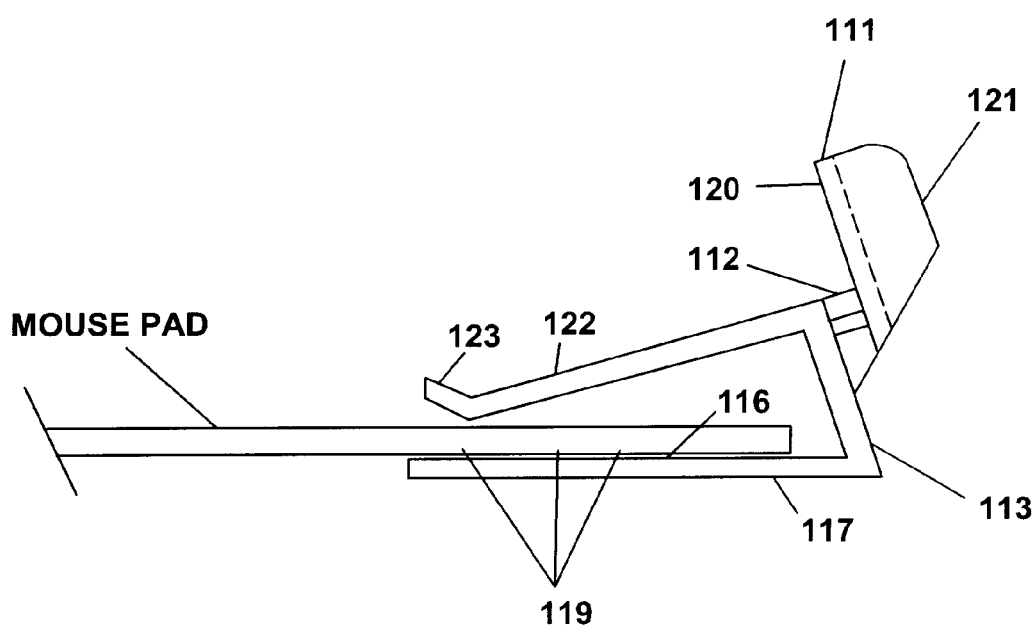
FIG. 9 is a side view of the device depicted in FIG. 8.

Another embodiment of this invention is shown generally as device 100 in FIGS. 8 and 9. Device 100 is comprised of a shackle 111 attached to a mounting means comprising a spacing means 112 attached to shackle 111, a support member 113 attached to spacing means 112, a top member 114 attached to support member 113, and a base member 115 attached to support member 113. Base member 115 has a top side 116, a bottom side 117, a cut-out portion 118, and a plurality of studs 119 projecting from top side 116 of base member 115 as shown in FIGS. 8 and 9. Base member 115 is attached to support member 113 at an acute angle as shown in FIG. 9. Shackle 111 is comprised of a partially cylindrical body 120 having flared lips 121 extending longitudinally on body 120. Top member 114 is comprised of plate 122 having flange 123. Flange 123 is attached to an obtuse angle to plate 122 and has beveled corners 125 and 126 to prevent injury to device users from sharp flange corners. Plate 122 is attached perpendicularly to support member 113 as shown in FIG. 9. Device 100 is utilized by mounting device 100 onto stationary objects such as onto a mouse pad by sliding the mouse pad between base member 115 and top member 114. The obtuse angled attachment of flange 123 to plate 122 allows for easy passage of the mouse pad between base member 115 and top member 114 while studs 119 act as barbs on the underside of an inserted mouse pad to frictionally secure the mouse pad between base member 115 and top member 114. Studs 119 are shown in FIGS. 8–9 as triangular projections; however, the studs can be any projecting shape so long as they frictionally secure mouse pads between base member 115 and top member 114. Mouse cord is then inserted between lips 121 and into partially cylindrical shackle body 120 to secure the mouse cord to device 100. Device 100 is constructed of resilient polymeric materials or metals permitting top member 114 and base member 115 to flex apart so that mouse pads of various thicknesses can be inserted between top member 114 and base member 115 and to allow repeated insertion of mouse cord into shackle 111. Device 100 can also be utilized without a mouse pad by mounting the device on a stationary surface such as on a desk top or on a computer table by glue or by other affixing means and then inserting the mouse cord into the device's shackle to restrain the excess mouse cord. Thus, device 100 allows a computer mouse user to move the length of mouse cord extending from the shackle to the mouse which is necessary to operate a computer mouse while controlling the movement of excess cord extending from the shackle to the back of the computer thereby preventing the excess cord from causing spills and cord entanglement when the computer mouse is moved. The purpose of spacer 112 is to make top member 114 accessible for the attachment of labels or to facilitate printing or engraving of top member 114 while maintaining a unitary device design.

Figure 7:
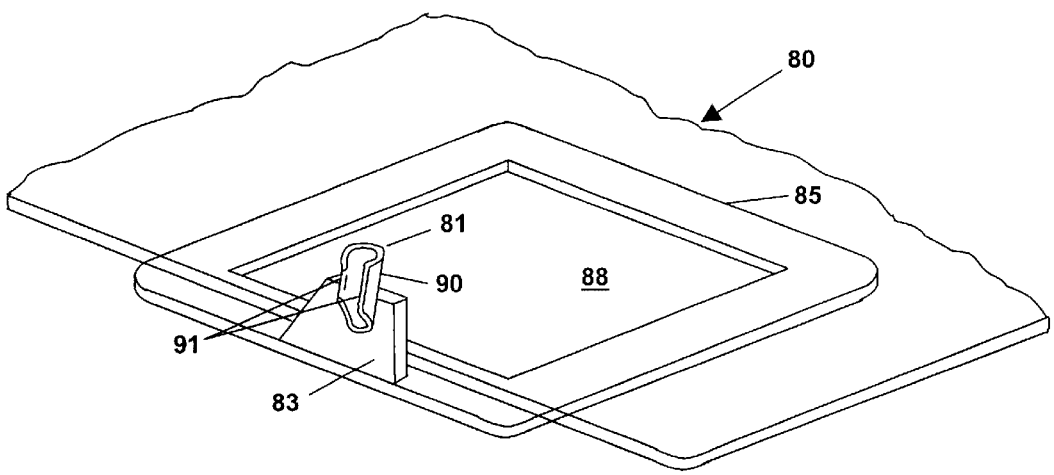
FIG. 7 is a perspective view depicting an embodiment of the device of the present invention.

Yet another embodiment of this invention is depicted in FIG. 7 shown generally as device 80. Device 80 is comprised of a shackle 81 attached to a mounting means comprising a support member 83, attached to shackle 81, and a base member 85 attached to support member 83. Base ember 85 has a cut-out section 88 and is attached to support member 83 at an acute angle. Shackle 81 is comprised of a partially cylindrical body 90, having flared lips 91 extending longitudinally on body 90 as shown in FIG. 7. Device 80 is attached to a mouse pad by adhering base member 85 to the bottom side of a mouse pad by adhesive strips, tape, or glue. Device 80 is also attachable to a mouse pad by positioning a mouse pad within cut-out section 88 such that base member 85 frames the mouse pad. Device 80 can also be affixed to a surface such as a desk top by glue or by other affixing means (not shown in the drawings). Device 80 is utilized by inserting mouse cord between lips 91 and into partial cylindrical shackle body 90 to secure the mouse cord to device 80 after base member 85 has been affixed to a stationary surface. Device 80 is also comprised of resilient materials such as metal or polymeric materials and allows repeated insertion of mouse cord into shackle 81.

Thus, the present invention provides a device which limited the movement of computer mouse cord to a length necessary to operate a computer mouse while restraining the movement of the remaining mouse cord length by allowing the length of mouse cord between the mouse and the shackle to be moved while the length of cord between the shackle and the computer is held stationary by the device. The device prevents mouse cord tangling and spills caused by the movement of excess cord between the shackle and the computer during computer mouse use. The device is constructed of resilient materials such as metals and/or polymeric materials to allow repeated insertions of mouse cord into the shackle, and is mountable to various stationary objects such as mouse pads and desks. Typical device construction materials include but are not limited to metals such as aluminum, tin, or steel, and polymers such as polyethylene, polypropylene, or acrylonitrile-butadiene-styrene copolymers.

While the preferred embodiments have been fully described and depicted for the purposes of explaining the principles of the present invention, it will be appreciated by those skilled in the art that modifications, substantiation, and changes may be made thereto without departing from the scope of the invention set forth in the appended claims.

We claim:

1. A device for controlling the movement of a computer mouse cord comprising:
    a shackle for attachment to said mouse cord, said shackle comprised of a partially cylindrical body;
    a mounting means attached to said shackle for mounting said shackle on a stationary object, said mounting means comprising:
        a support member attached to said shackle, said support member having a receptacle means;
        a top member attached to said support member, said top member being comprised of a plate having an angled flange and an insertable member attached to said plate, said insertable member being engageable with said receptacle means of said support member;
        a base member attached to said support member.
2. The device of claim 1 wherein said flange has beveled corners.
3. The device of claim 2 wherein said device is constructed of polymeric materials or metals.
4. The device of claim 1 wherein said base member, said support member, and said shackle are constructed of polymeric materials and said top member is constructed of metal.

5. The device of claim 1 wherein said mounting means further includes:
    a spacing means attached to said shackle and said support member.
6. In a device for controlling the movement of a computer mouse cord of a computer mouse operated on a computer mouse pad, the combination of which comprises:
    a shackle for controlling movement of said computer mouse cord, said shackle comprising an elongated clamp having an opening along its length which is capable of holding said computer mouse cord at a point along its length, to limit movement of said computer mouse cord to a portion of said computer mouse cord between said clamp and said computer mouse, and
    a mounting means attached to said shackle for mounting said shackle on said computer mouse pad, said mounting means comprising:
        a support member attached to said shackle,
        a top plate attached to said support member,
        a base member attached to said support member,
        whereby said top plate and said base member are capable of removably engaging said computer mouse pad.
7. The device defined in claim 6, wherein said top plate has an angled flange, and
    wherein a plurality of studs project upwardly from said base member.
8. The device defined in claim 7, wherein said flange has beveled corners.
9. The device defined in claim 7, wherein said device is constructed of polymeric materials.
10. The device defined in claim 7, wherein said support member has a receptacle means and wherein said top member further comprises an insertable member attached to said plate, said insertable member being engageable with said receptacle means of said support member.
11. The device defined in claim 6, wherein said base member has a cut out portion.
12. In a device for controlling the movement of a computer mouse cord of a computer mouse operated on a computer mouse pad, the combination of which comprises:
    a shackle for controlling movement of said computer mouse cord, said shackle comprising an elongated clamp having an opening along its length which is capable of holding said computer mouse cord at a point along its length, to limit movement of said computer mouse cord to a portion of said computer mouse cord between said clamp and said computer mouse, and
    a mounting means attached to said shackle for mounting said shackle on said computer mouse pad, said mounting means comprising:
        a support member attached to said shackle,
        a top plate attached to said support member,
        a base member attached to said support member,
        whereby said top plate and said base member are capable of removably engaging said computer mouse pad,
        wherein said top plate has an angled flange,
        wherein a plurality of studs project upwardly from said base member, and
        wherein said base member has a cut out portion.

* * * * *